(12) United States Patent
Maeda et al.

(10) Patent No.: US 7,321,839 B2
(45) Date of Patent: Jan. 22, 2008

(54) METHOD AND APPARATUS FOR CALIBRATION OF CAMERA SYSTEM, AND METHOD OF MANUFACTURING CAMERA SYSTEM

(75) Inventors: Kenichi Maeda, Kanagawa (JP); Yasuhiro Taniguchi, Cambridge, MA (US); Susumu Kubota, Kanagawa (JP); Hiroaki Nakai, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/510,583

(22) Filed: Aug. 28, 2006

(65) Prior Publication Data
US 2007/0005293 A1    Jan. 4, 2007

Related U.S. Application Data

(62) Division of application No. 10/704,550, filed on Nov. 12, 2003, now Pat. No. 7,124,046.

(30) Foreign Application Priority Data

Nov. 29, 2002 (JP) ............................ 2002-346914
Sep. 17, 2003 (JP) ............................ 2003-324615

(51) Int. Cl.
*G01C 25/00* (2006.01)
*G01D 18/00* (2006.01)

(52) U.S. Cl. ....................................... 702/104; 702/152

(58) Field of Classification Search ................ 702/152, 702/104
See application file for complete search history.

(56) References Cited

U.S. PATENT DOCUMENTS

| | | | |
|---|---|---|---|
| 5,117,285 A * | 5/1992 | Nelson et al. | 348/14.16 |
| 5,127,061 A * | 6/1992 | Amir et al. | 382/154 |
| 5,144,495 A | 9/1992 | Merton et al. | |
| 5,691,764 A | 11/1997 | Takekoshi et al. | |
| 5,737,122 A | 4/1998 | Wilt et al. | |
| 5,983,120 A * | 11/1999 | Groner et al. | 600/310 |
| 7,099,732 B2 * | 8/2006 | Geng | 700/117 |
| 2003/0122953 A1 * | 7/2003 | Huang et al. | 348/335 |
| 2004/0027451 A1 * | 2/2004 | Baker | 348/46 |
| 2004/0101110 A1 * | 5/2004 | Eppler | 378/207 |

FOREIGN PATENT DOCUMENTS

JP     2001-243456     9/2001

* cited by examiner

*Primary Examiner*—Michael P. Nghiem
*Assistant Examiner*—Cindy D. Khuu
(74) *Attorney, Agent, or Firm*—Oblon, Spivak, McClelland, Maier & Neustadt, P.C.

(57) ABSTRACT

A first mirror and a second mirror are disposed in such a manner that their reflective surfaces are parallel and face toward each other. A mark is drawn between the first mirror and the second mirror. An image of the reflections of the mark in the first mirror and the second mirror is captured with a camera. Calibration of the camera system is performed based on the image.

21 Claims, 15 Drawing Sheets

LINE OF MARK 104-1    LINE OF MARK 104-2

IMAGE TAKEN BY CAMERA 105-1

LINE OF MARK 104-2    LINE OF MARK 104-1

IMAGE TAKEN BY CAMERA 105-2

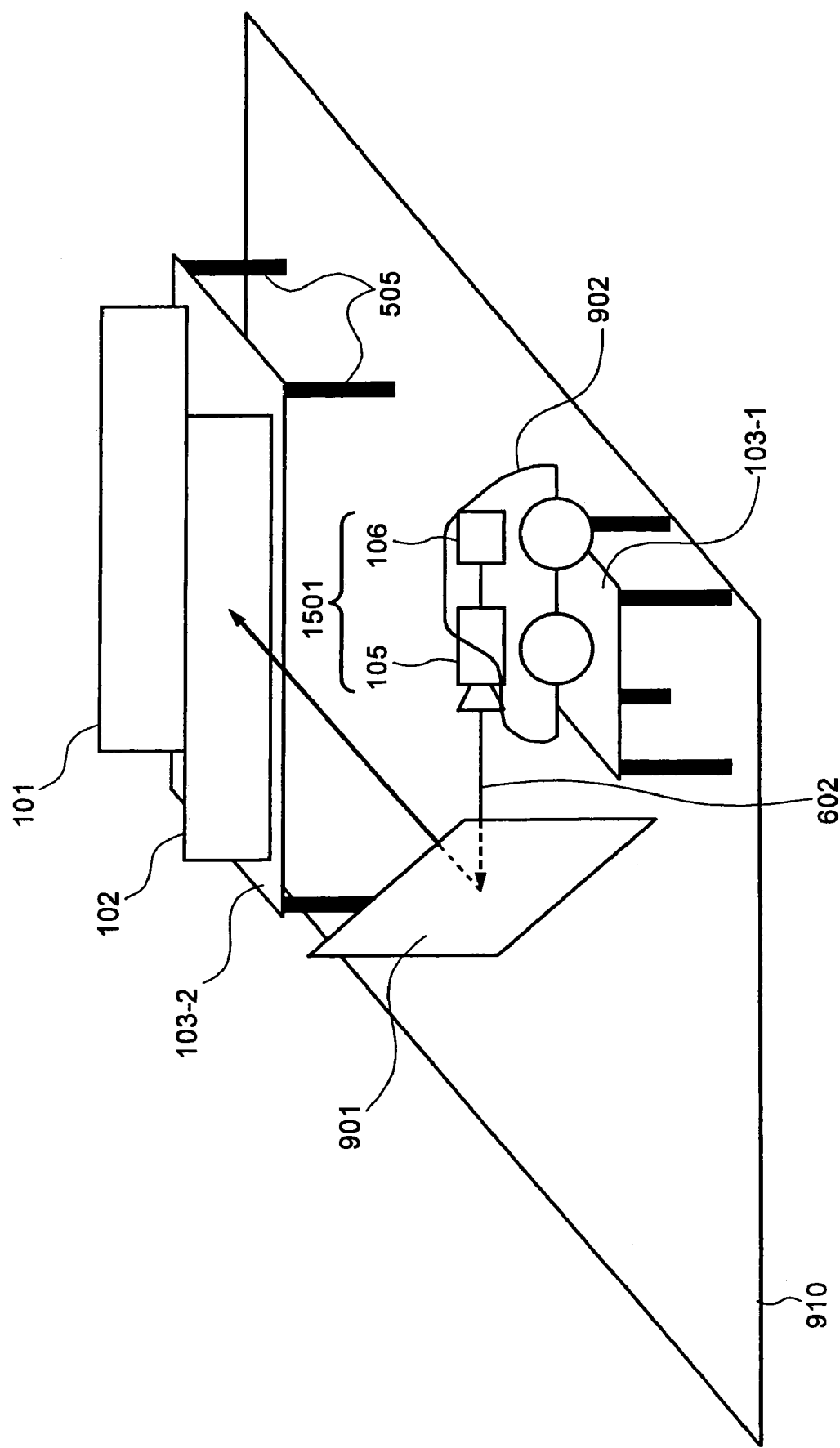

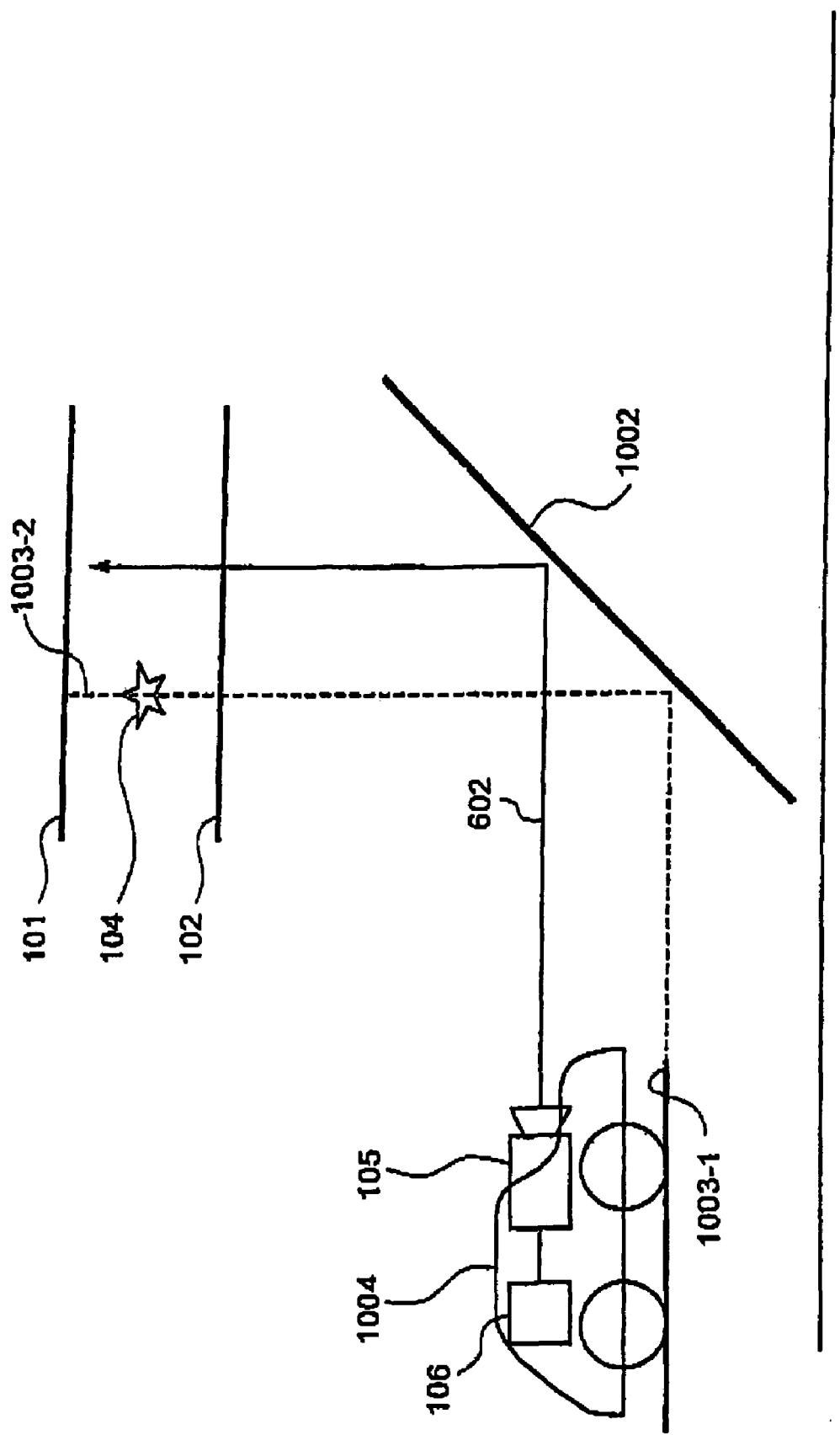

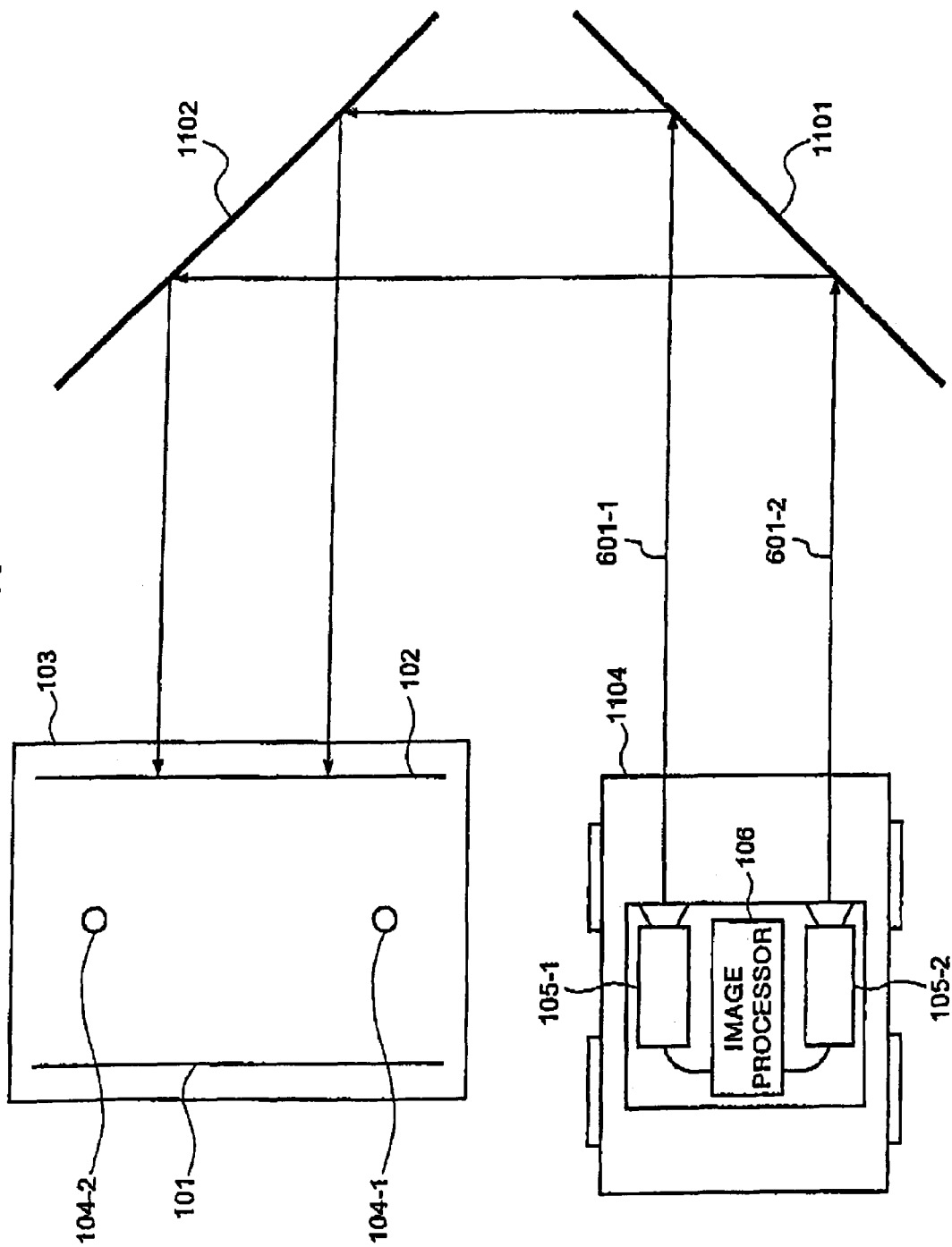

METHOD AND APPARATUS FOR CALIBRATION OF CAMERA SYSTEM, AND METHOD OF MANUFACTURING CAMERA SYSTEM

CROSS-REFERENCE TO RELATED APPLICATIONS

This application is a Divisional Application of, and claims the benefit of priority under 35 U.S.C. § 120 from, U.S. application Ser. No. 10/704,550, filed Nov. 12, 2003 now U.S. Pat. No. 7,124,046 and claims the benefit of priority under 35 U.S.C. § 119 from Japanese Patent Applications No. 2002-346914 filed on Nov. 29, 2002 and No. 2003-324615 filed on Sep. 17, 2003. The entire contents of each of the above applications are incorporated herein by reference.

BACKGROUND OF THE INVENTION

1) Field of the Invention

The present invention relates to a method and an apparatus for calibration of a camera system, and a method of manufacturing the camera system.

2) Description of the Related Art

Recently, a camera system that recognizes information, for example, position information, of an object in an image taken by a camera has been developed.

For instance, the technology that recognizes an obstacle from a picture taken by two or more cameras is proposed in Japanese Patent Application Laid-open Publication No. 2001-243456.

Such a camera system is sometimes installed on the vehicles. A camera, which may be installed inside or outside the vehicle, captures an image of a forward area of the vehicle. It is recognized from the image whether an obstacle (e.g. other vehicles) is present in front of the vehicle. If an obstacle is present, a distance between the obstacle and the vehicle is calculated. This camera system is calibrated immediately prior to its shipment. The calibration process includes calibration of the installation position of the camera as well as setting of various parameters that are required for taking a picture.

The calibration is performed according to the following procedure: 1) fix a camera at a predetermined position so that the camera covers a region in which two or more marks are placed; 2) take a picture of a region and obtain position information of the marks (hereinafter, "picture mark information") in the picture; and 3) perform calibration process based on a difference between the picture mark information and actual position information of the marks (hereinafter, "actual mark information"), which is know in advance. The calibration can be performed more accurately if the region covered by the camera is large and when there are lot of marks in the region. In other words, for better accuracy, a large space (e.g. distances of about several tens to a hundred meters from the camera) and a lot of marks are required.

Other approach is to use the Planar Projection Stereopsis. A camera system that employs the planar projection stereopsis is disclosed in, for example, Japanese Patent Application Laid-open Publication No. 2001-243456. In this camera system, since it is necessary to obtain parameters for plane projection, its calibration also requires information that indicates how the plane is projected on the picture. In other words, for better accuracy, a large plane and a lot of marks are required.

Thus, the conventional camera systems give better accuracy only if a large space is available. This requirement makes it impossible to perform the calibration inside the factory where the camera system is manufactured. As a result, to perform the calibration, the camera system is installed on a vehicle and the vehicle is carried to a place such as a road, which is outside the factory, where a lot of marks are placed. However, this makes the process cumbersome.

SUMMARY OF THE INVENTION

It is an object of the present invention to at least solve the problems in the conventional technology.

A method for calibration of a camera system according to one aspect of the present invention includes disposing a first mirror and a second mirror in such a manner that reflective surfaces of the first mirror and the second mirror are parallel and face toward each other; placing a mark between the first mirror and the second mirror; capturing with the camera an image of the marks reflected in the first mirror and the second mirror; and performing calibration of the camera system based on the image.

A method for calibration of a stereo camera system that includes a plurality of cameras according to another aspect of the present invention includes disposing a first mirror and a second mirror in such a manner that reflective surfaces of the first mirror and the second mirror are parallel and face toward each other; placing at least two marks between the first mirror and the second mirror; capturing with the cameras an image of the marks reflected in the first mirror and the second mirror; determining position of the marks in each of the images, wherein the position of each of the marks is represented by a pair of coordinates; and calculating projective transformation parameters between the images from the position of the marks and by using as a reference a plane where the marks are placed.

An apparatus for calibration of a camera system according to still another aspect of the present invention includes a first mirror having a reflective surface; a second mirror that is parallel to the first mirror and having a reflective surface, wherein the reflective surfaces of the first mirror and the second mirror face toward each other; and a mark that is disposed between the first mirror and the second mirror.

An apparatus for calibration of a stereo camera system that includes a plurality of cameras according to still another aspect of the present invention includes a first mirror having a reflective surface; a second mirror that is parallel to the first mirror and having a reflective surface, wherein the reflective surfaces of the first mirror and the second mirror face toward each other; a plurality of marks that are disposed between the first mirror and the second mirror; and an image processor that calculates projective transformation parameters between images captured by the cameras from a position of the marks in the images and by using as a reference a plane where the marks are placed, wherein the position of each of the marks is represented by a pair of coordinates.

A method of manufacturing a camera system according to still another aspect of the present invention includes installing the camera in a predetermined position; disposing a first mirror and a second mirror in such a manner that reflective surfaces of the first mirror and the second mirror are parallel and face toward each other; placing a mark between the first mirror and the second mirror; capturing with the camera an image of the marks reflected in the first mirror and the second mirror; and performing calibration of the camera system based on the image.

A method of manufacturing a stereo camera system, which includes a plurality of cameras and a memory, according to still another aspect of the present invention includes installing the cameras in a predetermined position; disposing a first mirror and a second mirror in such a manner that reflective surfaces of the first mirror and the second mirror are parallel and face toward each other; placing at least two marks between the first mirror and the second mirror; capturing with the cameras an image of the marks reflected in the first mirror and the second mirror; determining position of the marks in each of the images, wherein the position of each of the marks is represented by a pair of coordinates; calculating projective transformation parameters between the images from the position of the marks and by using as a reference a plane where the marks are placed; and storing the projective transformation parameters in the memory.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 15 is a modification of the calibration support device;

FIG. 16 is another modification of the calibration support device; and

FIG. 17 is still another modification of the calibration support device.

DETAILED DESCRIPTION

Exemplary embodiments of a method and an apparatus for calibration of a camera system, and a method of manufacturing the camera system relating to the present invention will be explained in detail below with reference to the accompanying drawings.

Figure 1:
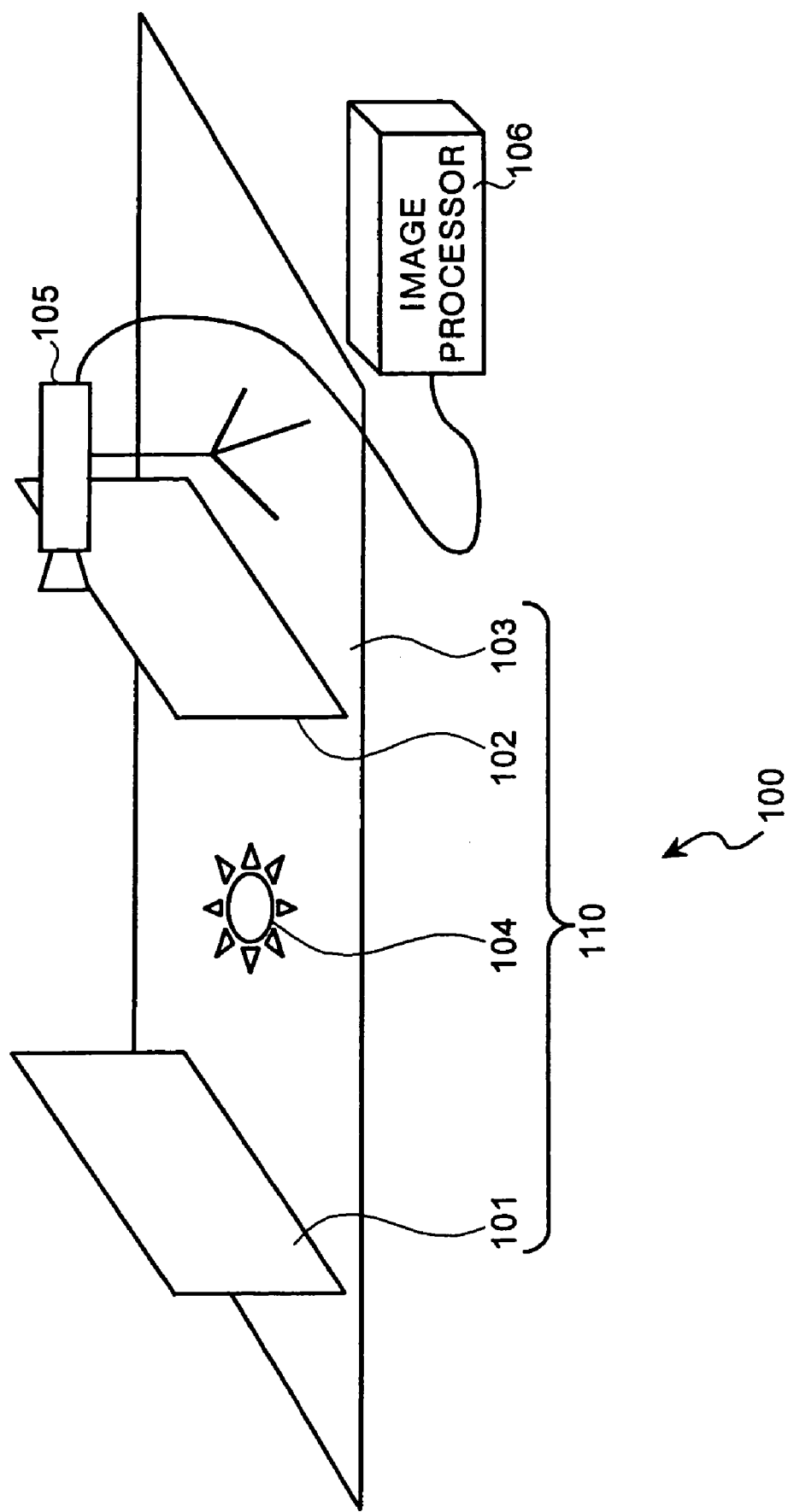
FIG. 1 is a schematic view of a calibration apparatus according to a first embodiment of the present invention.
Figure 2:
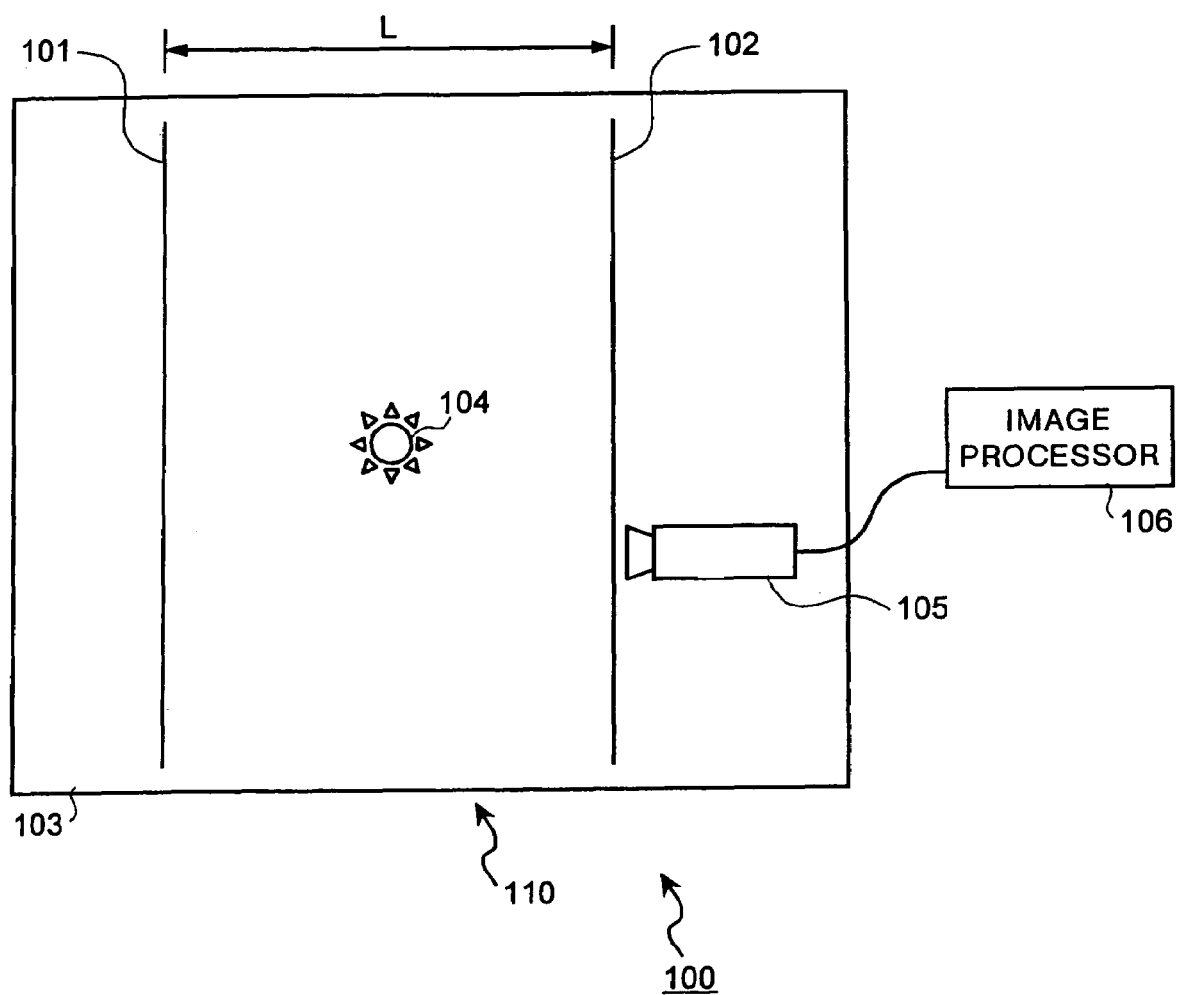
FIG. 2 is a schematic top view of the calibration apparatus.

FIG. 1 and FIG. 2 are schematic views of a calibration apparatus according to a first embodiment of the present invention. The calibration apparatus 100 includes a calibration support device 110, a camera 105, and an image processor 106. The calibration support device 110 includes a mirror 101 (a first mirror), a mirror 102 (a second mirror), and a plate-like base 103. The mirrors 101 and 102 are disposed on the base 103 in such a manner that the mirrors 101 and 102 are normal to the base 103, there is a predetermined distance L between the mirrors 101 and 102, and the reflective surfaces of the mirrors 101 and 102 face each other.

It is preferable that the distance between the mirrors 101 and 102 is 1 meter, however, the distance may be longer or shorter than 1 meter. A mark 104 is placed on the base 103 between the mirrors 101 and 102. It is preferable that the mark 104 is easily distinguishable from any other object. One approach is to make the mark 104 from a light source (e.g., a light, an LED, a lamp, or a candle). Another approach is to form the mark with a paint having high-brightness (e.g., white paints or fluorescent paints).

The calibration support device 110 and the camera 105 are disposed in the manner as shown in FIGS. 1 and 2. The image processor 106 is, for example, a computer device such as a personal computer, and includes a display unit (e.g., a liquid crystal display or a cathode ray tube), an input device (e.g., a mouse or a keyboard), and a CPU, a memory, and an external storage. This image processor 106 executes the calibration processing according to programs stored in the external storage.

In the first embodiment, a situation that a lot of marks are scattered over a vast area is simulated by the calibration support device 110 and the camera.

Figure 3:
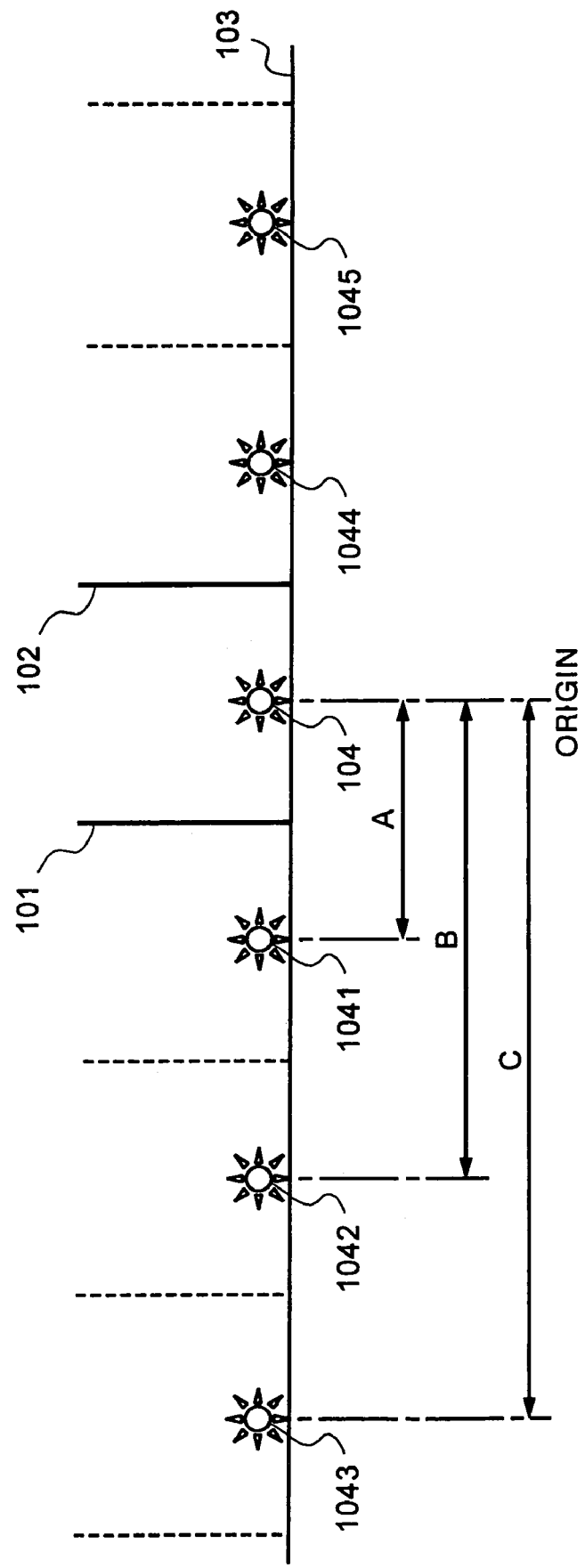
FIG. 3 is an illustration indicating a lot of reflective images of a mark.

Precisely, since the reflective surfaces of the mirrors 101 and 102 are parallel and face each other, when viewed from the direction of the camera 105, as shown in FIG. 3, it appears as if a lot of marks 1041, 1042, 1043, 1044, 1045 and so on, are arranged in a line over a long distance, because, the mark 104 is reflected repeatedly.

Considering the position of the real mark 104 to be the origin, virtual marks 1041, 1042, 1043 are obtained at distances A, B, C, respectively, from the origin such that C>B>A. If the mark 104 is equidistant from the mirrors 101 and 102, then B=2×A and C=3×A so that the virtual marks 1041, 1042, 1043 appear at the distances A, 2×A, 3×A from the origin. On the other hand, if the mark 104 is not equidistant from the mirrors 101 and 102, then there may not be a specific relation between the distances A, B, C.

In this arrangement, assuming that the distances between the mark 104 and the mirrors 101 and 102, respectively, are known, the distance between the origin and the virtual marks can be calculated easily. The calculation is easier if the mark 104 is equidistant from the mirrors 101 and 102, because, there is a specific relationship between the distance between the origin and the virtual marks.

One approach is to place the camera 105 between the mirrors 101 and 102. Although this arrangement will output maximum number of virtual images, this arrangement is unrealistic. A better approach is to focus the camera 105 from little above the mirror 102 (or the mirror 101) the mirror 101 (or the mirror 102).

Figure 4:
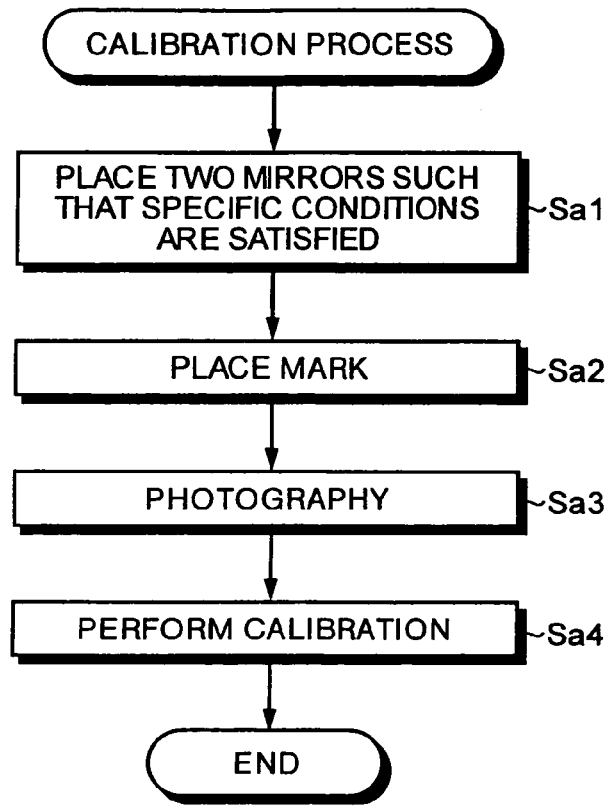
FIG. 4 is a flow chart of a calibration method according to the first embodiment.

The flow chart in FIG. 4 details the calibration process. The mirrors 101 and 102 are placed on the base 103 (step Sa1). In other words, the mirrors 101 and 102 are disposed on the base 103 in such a manner that the mirrors 101 and 102 are normal to the base 103, there is a predetermined distance L between the mirrors 101 and 102, and the reflective surfaces of the mirrors 101 and 102 face each other.

A mark is placed on the base 103 between the mirrors 101 and 102 (step Sa2). Thus, the steps Sa1 and Sa2 realize the calibration support device 110. If the calibration support device 110 is available, the steps Sa1 and Sa2 are can be omitted. In other words, if the calibration support device 110 is available, adjusting the positions of the mirrors, which is a complex process, can be omitted.

During repeated use the mirrors 101 and 102 may shift relatively. If the mirrors 101 and 102 shift relatively, it is necessary to adjust the positions of the mirrors 101 and 102. The best positions of the mirrors 101 and 102 are such that the mark 104 and a lot of virtual marks appear in a line.

Figure 5:
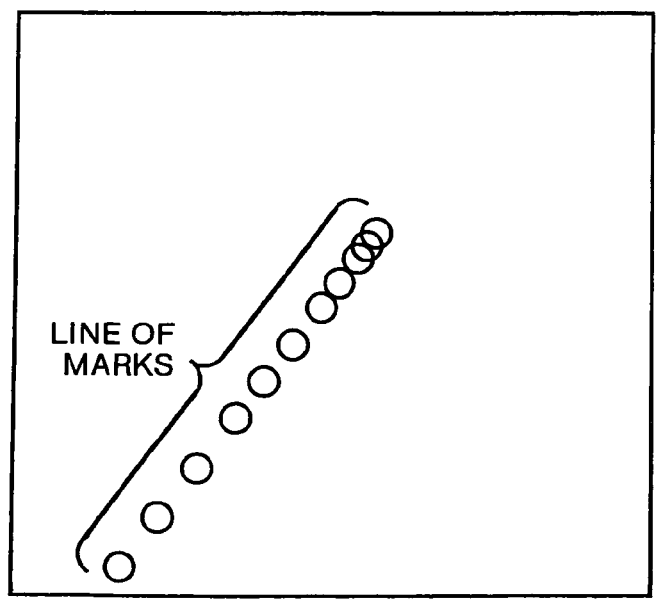
FIG. 5 is an example of an image of the mark arranged in a line diagonally across the mirror.

When positioning the camera 105 and the calibration support device 110, the calibration support device 110 is fixed and the camera 105 is moved near the calibration support device 110. On the other hand, if, for example, the camera 105 is already fixed to the vehicle, the calibration support device 110 may be moved near the camera 105. When the camera 105 is fixed, as shown in FIG. 2, so that the camera 105 points in a direction (i.e., the optical axis of the camera) other than the direction of a straight line that joins the camera 105 and the mark 104 (hereinafter, "a first arrangement"), the camera 105 captures an image that includes a lot of marks positioned on an inclined straight line. FIG. 5 is an example of such an image.

When the camera 105 is fixed so that the camera 105 points toward the mark 104 (hereinafter, "a second arrangement"), the camera 105 captures an image that includes a lot of marks positioned on a vertical straight line. Whether to employ the first arrangement or the second arrangement depends on the purpose of the camera system. For example, if detection of a distance between the vehicle and a lane line (a mark, e.g., a white line) is the purpose, it is preferable that the camera 105 does not point toward the mark (i.e., the lane line). In other words, in this case it is preferable to employ the first arrangement.

Once the positions between the camera 105 and the calibration support device 110 are adjusted, the camera 105 takes a picture. As a result, the camera 105 captures an image containing a lot of marks (step Sa3). The image obtained by the camera 105 is input to the image processor 106.

The image processor 106 performs calibration processes of setting various parameters or table data according to operator's instructions (step Sa4). This calibration processes includes setting of parameters for image correction and setting of table data for distance detection. In the setting of parameters for image correction, when there are image distortions due to the characteristics of the camera 105 in the image, the image processor 106 acquires parameters for correcting the distortions, and stores the parameters in a parameter setting memory of the camera system. When there are no image distortions due to the characteristics of the camera 105, an image that includes a lot of marks in a line is obtained.

On the other hand, when there are image distortions due to the characteristics of the camera 105, an image that includes a lot of marks on a curve is obtained. The image processor 106 compares, when the camera has the distortion characteristics, each of original positions where a lot of marks are arranged in the captured image without distortion, with each of distorted positions where a lot of marks are arranged in the captured image with distortion.

The image processor 106 also calculates table data for distance detection from the positions of the marks in the captured image and actual positions of the marks 104 and their virtual marks, and registers in a distance detection table. Respective distances from actual marks (the mark 104 and their virtual marks) corresponding to marks in the captured image to the camera 105 are calculated in advance (see FIG. 3). Therefore, the table data for distance detection can be created by associating the positions of actual marks with the positions of the marks in the captured image.

In the table data, for example, a captured mark indicated as a distance of XX (milimeters) from the bottom of the captured image is associated with an actual mark indicated as a distance YY (meters) between the camera 105 and the actual mark (a simulated mark) corresponding to the captured mark.

The positions of the marks in the captured image may be indicated by pixel information of the position of each mark in the captured image, not distance information like XX (milimeters). For example, the pixel information includes the n-th pixel from an edge of the captured image. As a result, the camera system can calculate the distance from the camera 105 to an actual object to be detected from the captured image and the table data for distance detection.

The image processor 106 may derive an equation from the relation between the positions of the marks in the captured image and an actual distance, and set the equation to the camera system. The calibration method according to the first embodiment can produce a virtual situation that a lot of marks are scattered over a vast area in the front of the camera 105, by using two mirrors that face each other.

Therefore, taking a picture of the mirror by the camera 105 provides an image containing a lot of marks that scattered over the vast area. That is, the calibration method provides higher accuracy calibration for the camera system in a small space. As a result, it is possible to calibrate the camera system with higher accuracy in a space limited such as a factory.

Figure 6:
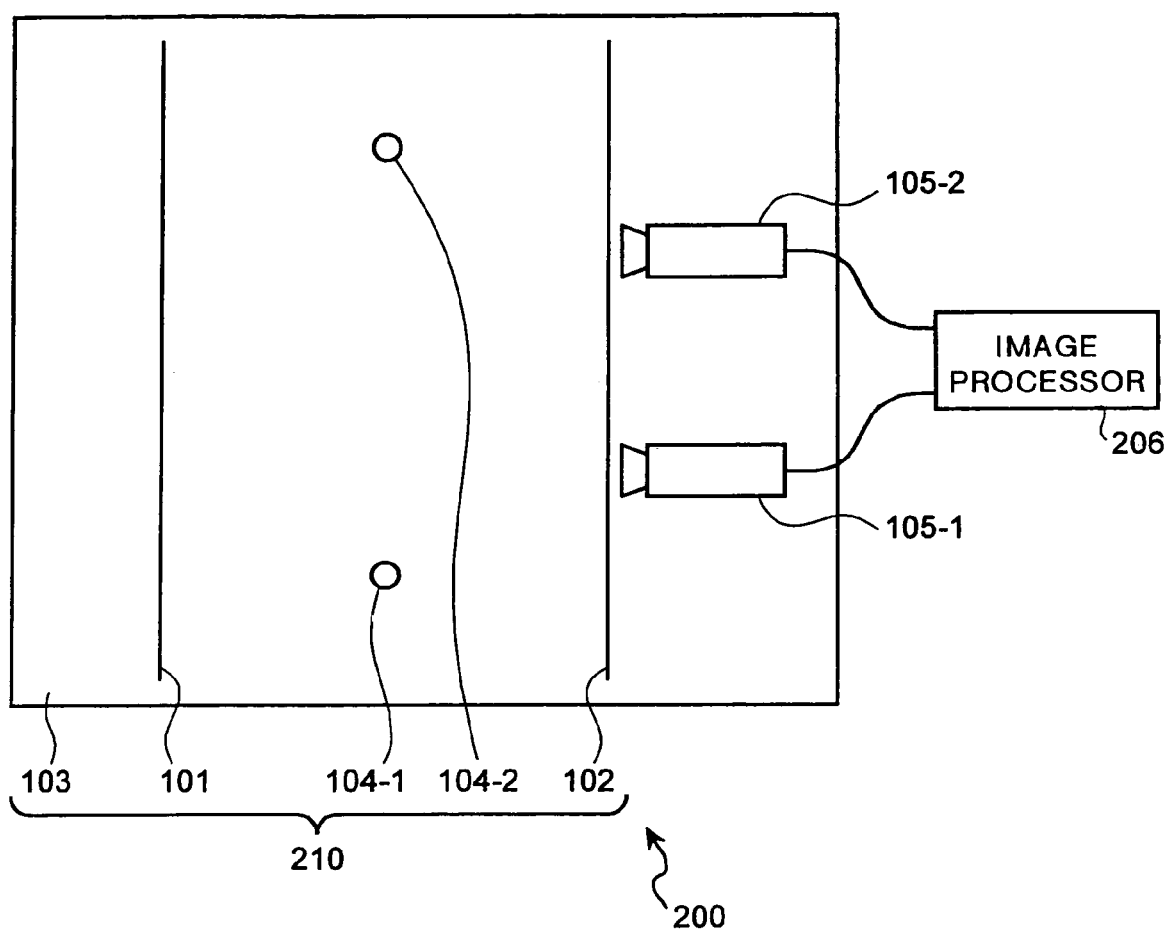
FIG. 6 is a schematic top view of a calibration apparatus according to a second embodiment of the present invention.

FIG. 6 is a schematic top view of a calibration apparatus according to a second embodiment of the present invention. A calibration apparatus 200 includes a calibration support device 210, cameras 105-1 and 105-2, and an image processor 206. The calibration support device 210 is different from the calibration support device 110 of the first embodiment in that two marks are placed on the base 103. Since the arrangement of the mirrors 101 and 102 is similar to that in the first embodiment.

In the calibration support device 210, two marks 104-1 and 104-2 are placed between the mirrors 101 and 102, on the base 103. The marks 104-1 and 104-2 may be placed at a position equidistant from the mirrors 101 and 102 as in the first embodiment, or may be placed in other positions. In FIG. 6, the marks 104-1 and 104-2 are placed so that a line connecting between the marks is parallel to the reflective surfaces of the mirrors 101 and 102. The arrangement of the marks 104-1 and 104-2, however, is not limited to the arrangement shown in FIG. 6.

The image processor 206 has similar configuration as the image processor 106 of the first embodiment, and the calibration processing (described later) is executed according to programs stored in the external storage. The calibration method according to the second embodiment is for calibration of the stereo camera system that performs the planar projection stereopsis method.

The planar projection stereopsis method refers to processes that include capturing images by two cameras; associating all the pixels of the image captured from one of the two cameras with points on a road; converting the pixels into a capturing view out of the other; and thereby recognizing obstacles on the road.

Figure 7:
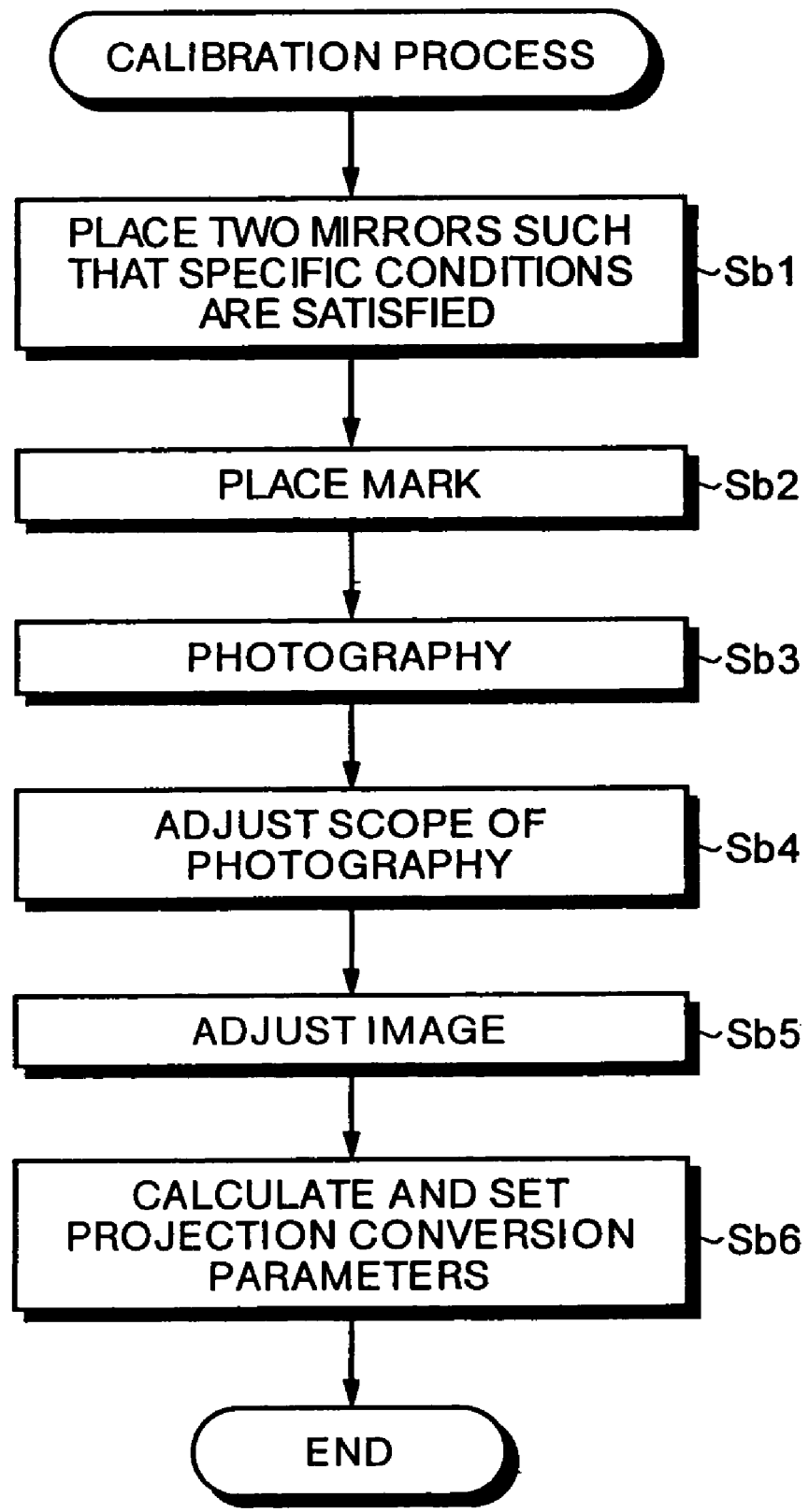
FIG. 7 is a flow chart of a calibration method according to the second embodiment.

According to this calibration method, the situation that a lot of marks are scattered over a vast area from around the camera is simulated, and the result is captured as images by the cameras 105-1 and 105-2. First, the mirrors 101 and 102 are placed in predetermined positions from the cameras 105-1 and 105-2 (step Sb1 in FIG. 7). The mirrors 101 and 102 are also arranged so that the reflective surfaces of the mirrors are in parallel and face each other.

After that, two or more marks are placed between the mirrors 101 and 102 (step Sb2). The use of the calibration support device 210 makes steps Sb1 and Sb2 simply because of two mirrors and two marks, which are fixed in their positions. In other words, when the calibration support device 210 is used, only the installation of the cameras 105-1 and 105-2 remains. The positions (e.g., a distance between the two cameras) of two cameras 105-1 and 105-2 are fixed in the stereo camera system. The positions between two mirrors 101 and 102 and two cameras 105-1 and 105-2 indicate such relations that the cameras 105-1 and 105-2 take a picture of a lot of marks (virtual marks) in one of the mirrors.

Adjusting the positions between the cameras 105-1 and 105-2 and the calibration support device 210 is performed as follows: 1) move the stereo camera system while the calibration support device 210 is fixed; 2) move the calibration support device 210 while the stereo camera system is fixed; or 3) move both the calibration support device 210 and the stereo camera system. When the cameras 105-1 and 105-2 are fixed so that the direction (the directions of the optical axes) that the cameras point shifts from the marks 104-1 and 104-2 as shown in FIG. 6, images as illustrated in FIGS. 8 and 9 is obtained.

Figure 8:
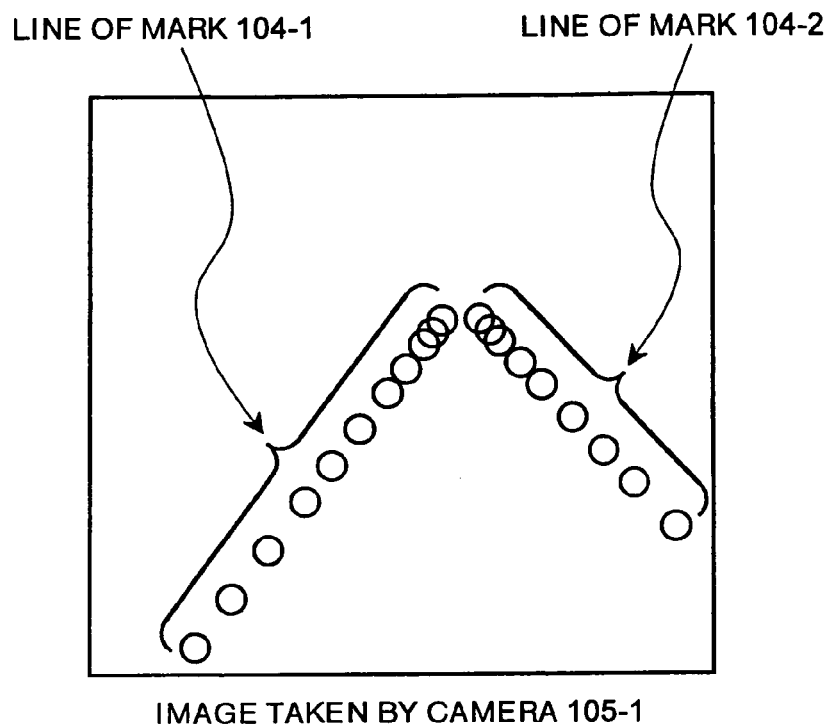
FIG. 8 is an example of an image captured by one of two cameras.
Figure 9:
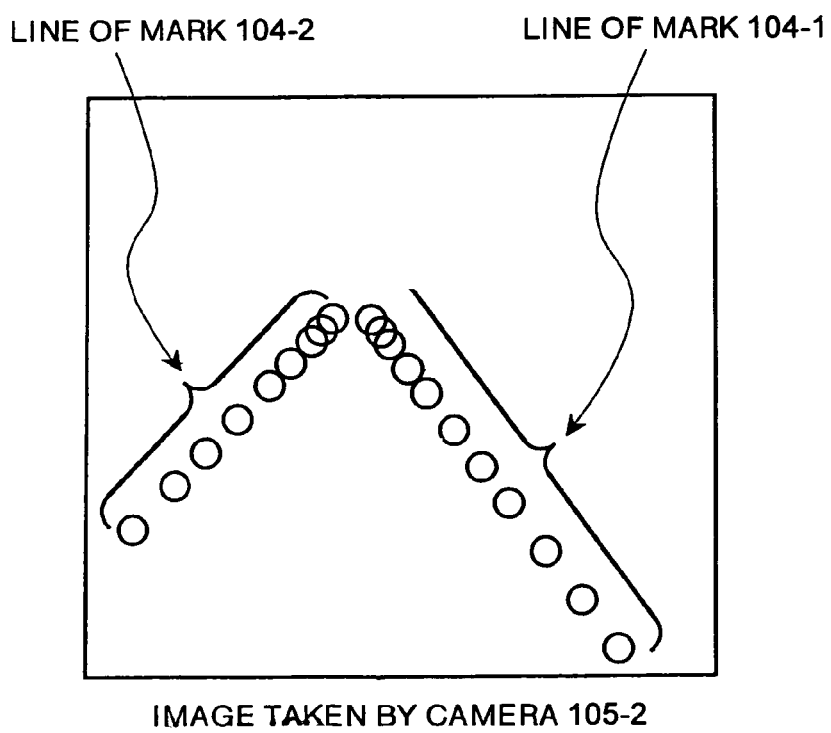
FIG. 9 is an example of an image captured by the other of the two camera.

FIG. 8 illustrates an image taken by the camera 105-1, and FIG. 9 illustrates an image taken by the camera 105-2. Each of these includes a lot of marks on an inclined line. The positions between the marks 104-1 and 104-2 and the cameras 105-1 and 105-2 are not limited to those shown in FIG. 6, and may be determined depending on the purpose of the stereo camera system. For the calibration of the stereo camera system installed in the vehicle, the arrangement shown in FIG. 6 is preferable.

Once the positions of the cameras 105-1 and 105-2 and the calibration support device 210 are adjusted, each of the cameras 105-1 and 105-2 takes a picture (step Sb3). As a result, captured images containing a lot of their virtual marks are obtained. The images obtained by the cameras 105-1 and 105-2 are input to the image processor 206.

The image processor 206 performs necessary work for the calibration based on instructions from the operator. The calibration includes two stages. The first stage is an adjustment of scopes of the cameras for taking a picture and the captured images. The second stage is calculations of parameters for the projective transformation with respect to a plane.

First, the scopes of the cameras 105-1 and 105-2 are adjusted in the first stage (step Sb4). Ideally, the cameras 105-1 and 105-2 are positioned so that their scopes overlap. The scopes of the cameras are adjusted by confirming the view from each camera. The adjustment is to change the direction or the arrangement of the cameras so that a point vanishing at infinity in a line of the mark 104-1 and their virtual marks, and a point vanishing at infinity in a line of the mark 104-2 and their virtual marks, are positioned around the midpoint between side edges of each image. As a result of the adjustment, it is preferable that a position from the top edge of the image captured by the camera 105-1 is the same as that of the image captured by the camera 105-2.

The images are adjusted in the next step of the first stage (step Sb5). In this step, if the images are distorted due to the characteristics of the cameras, the image processor 206 acquires parameters to correct the distortion in the same manner as in the first embodiment. At the second stage, the image processor 206 calculates parameters of the projective transformation with respect to a plane. The parameters are set to the stereo camera system (step Sb6).

First, an operator visually decides a relation between each mark in the image captured by the camera 105-1 and each mark in the image captured by the camera 105-2. It is necessary to include at least four pairs of marks when taking the decision. Each pair is specified using the coordinates of the marks in the pair, and the coordinates are input to the image processor 206. Each of the images captured by the cameras 105-1 and 105-2 contains a line of the mark 104-1 and their reflective image marks, and a line of the mark 104-2 and their reflective image marks, as shown in FIGS. 8 and 9. The relation is decided by comparing the lines of the mark 104-1 between the two images and comparing the lines of the mark 104-2 between the two images.

The image processor 206 calculates the projective transformation parameters from the relation and the coordinates input. Suppose that a point (ui, vi) in the image by the camera 105-1 corresponds to a point (ui', vi') in the image by the camera 105-2, and conversion parameter H meets the following equation (1):

$$H = (h_{11}, h_{12}, h_{13}, h_{21}, h_{22}, h_{23}, h_{31}, h_{32}, h_{33}) \quad (1)$$

$$u' = \frac{h_{11}u + h_{12}v + h_{13}}{h_{31}u + h_{32}v + h_{33}}$$

$$v' = \frac{h_{21}u + h_{22}v + h_{23}}{h_{31}u + h_{32}v + h_{33}}$$

where i is a natural number of not less than 1 and not more than N, and N>3.

When each coordinate value of the marks of N pairs is substituted into the equation (1), simultaneous equations with an unknown value H is obtained. The projective transformation parameters are calculated from the obtained simultaneous equations, using, for example, the least squares method. It is necessary that the inequality N>3 be satisfied because of the following reason. The conversion parameter H has nine parameters, and the eight of them are independent parameters. The number of degrees of freedom, for example, is determined to eight by setting a sum of squares of all parameters at one or setting h33 at 1.

The number of degrees of freedom of eight means all parameters are calculated from eight equations. Since a pair of the marks derives two equations for u and v, four pairs of the marks (i.e., pairs of more than three) is required to obtain eight equations. It is necessary that three or more of these marks are not placed in a single line.

The image processor 206 stores the calculated projective transformation parameters in the parameter setting memory of the stereo camera system. If the cameras 105-1 and 105-2 have functions for distortion correction of the image, the image processor 206 may store the transformation parameters for the distortion correction in the cameras 105-1 and 105-2.

According to a calibration method of the second embodiment, a situation that a lot of marks are scattered over a vast area in front of the cameras 105-1 and 105-2 is simulated by using the two mirrors which face each other. Therefore, taking a picture of one of the mirrors by the cameras 105-1 and 105-2 provides an image containing a lot of marks scattered over a vast area. In other words, the captured image containing a lot of marks widely scattered can be obtained even if there is only a small space available.

Moreover, the calculation of the projective transformation parameters from the captured image allows more accurate projective transformation and thus the obstacle can be detected more accurately. The reason why that it is preferable to scatter a lot of marks over a vast area will be explained below.

The conversion parameter H is for directly converting the image by the camera 105-1 into the image by the camera 105-2. This conversion actually is to project the image by the camera 105-1 in the plane in the real space, and then to convert the projection result into the image by the camera 105-2. Conversion that projects the image by the camera 105-1 in a road plane in the real space is explained as an example to explain simply. In addition, a relation between scattering in the direction of the depth of the mark (in a direction away from around the camera) and estimated errors of the parameters are explained based on the planar projection stereopsis method.

In the planar projection stereopsis method, suppose that an optical axis of each camera is almost parallel in the direction of the depth and a spread in the horizontal and vertical directions is smaller than that in the direction of the depth, a relation between coordinates (X, Y, Z) of the real space and coordinates (u, v) of the image is approximated by the following equation:

$$\begin{pmatrix} u \\ v \end{pmatrix} = \frac{1}{Z}\begin{pmatrix} p_{11} p_{12} p_{13} p_{14} \\ p_{21} p_{22} p_{23} p_{24} \end{pmatrix}\begin{pmatrix} X \\ Y \\ Z \\ 1 \end{pmatrix} \quad (2)$$

The calibration of the camera is performed by calculating the value of parameter $p_{ij}$ by using n pairs of spatial coordinates $(X_i, Y_i, Z_i)$ of the mark and coordinates $(u_i, v_i)$ of its image. In this case, i=1, 2 and j=1, 2, 3, 4.

Estimation of the parameters by least squares and its error will be explained below. First, the following equation is obtained from equation (2):

$$Ap_1 = u \quad (3)$$
$$Ap_2 = v$$

$$A = \begin{pmatrix} \frac{X_1}{Z_1} & \frac{X_1}{Z_1} & 1 & \frac{1}{Z_1} \\ & \vdots & & \\ \frac{X_N}{Z_N} & \frac{Y_N}{Z_N} & 1 & \frac{1}{Z_N} \end{pmatrix}$$

-continued
$$p_1 = (p_{11}, p_{12}, p_{13}, p_{14})^T$$
$$p_2 = (p_{21}, p_{22}, p_{23}, p_{24})^T$$
$$u = (u_1, \ldots, u_N)$$
$$v = (v_1, \ldots, v_N)$$

A least squares solution of equation (3) is given by:

$$p_1 = (A^T A)^{-1} A^T u$$
$$p_2 = (A^T A)^{-1} A^T v \quad (4)$$

Set error variances of coordinates (u, v) of the image to σu2 and σv2 respectively, suppose that there is no relation between the error variances, and the matrix Var is given by:

$$Var(u) = \sigma_u^2 I \quad (5)$$
$$Var(v) = \sigma_v^2 I$$
$$Var(p_1) = \sigma_u^2 (A^T A)^{-1} A^T | A (A^T A)^{-1}$$
$$= \sigma_u^2 (A^T A)^{-1}$$
$$= \sigma_u^2 \sum_i \left(\frac{X_i}{Z_i}, \frac{Y_i}{Z_i}, 1, \frac{1}{Z_i}\right)^T \left(\frac{X_i}{Z_i}, \frac{Y_i}{Z_i}, 1, \frac{1}{Z_i}\right)$$
$$Var(p_2) = \sigma_v^2 (A^T A)^{-1} A^T | A (A^T A)^{-1}$$
$$= \sigma_v^2 (A^T A)^{-1}$$
$$= \sigma_v^2 \sum_i \left(\frac{X_i}{Z_i}, \frac{Y_i}{Z_i}, 1, \frac{1}{Z_i}\right)^T \left(\frac{X_i}{Z_i}, \frac{Y_i}{Z_i}, 1, \frac{1}{Z_i}\right)$$

Therefore, it is preferable that vector $(X_i/Z_i, Y_i/Z_i, 1, 1/Z_i)$ has scattered widely to reduce the error of the parameter $p_{ij}$. From the fourth component of $1/Z_i$, especially, it is preferable that the marks are distributed widely from near to far. Therefore, it is preferable for the captured image to contain the marks widely scattered in the direction of the depth to calculate the projective transformation parameters.

In this respect, there are more marks in the second embodiment as compared to those in the first embodiment. As a result, it is possible to obtain a captured image containing a lot of marks scattered widely without preparing a vast space.

Figure 10:
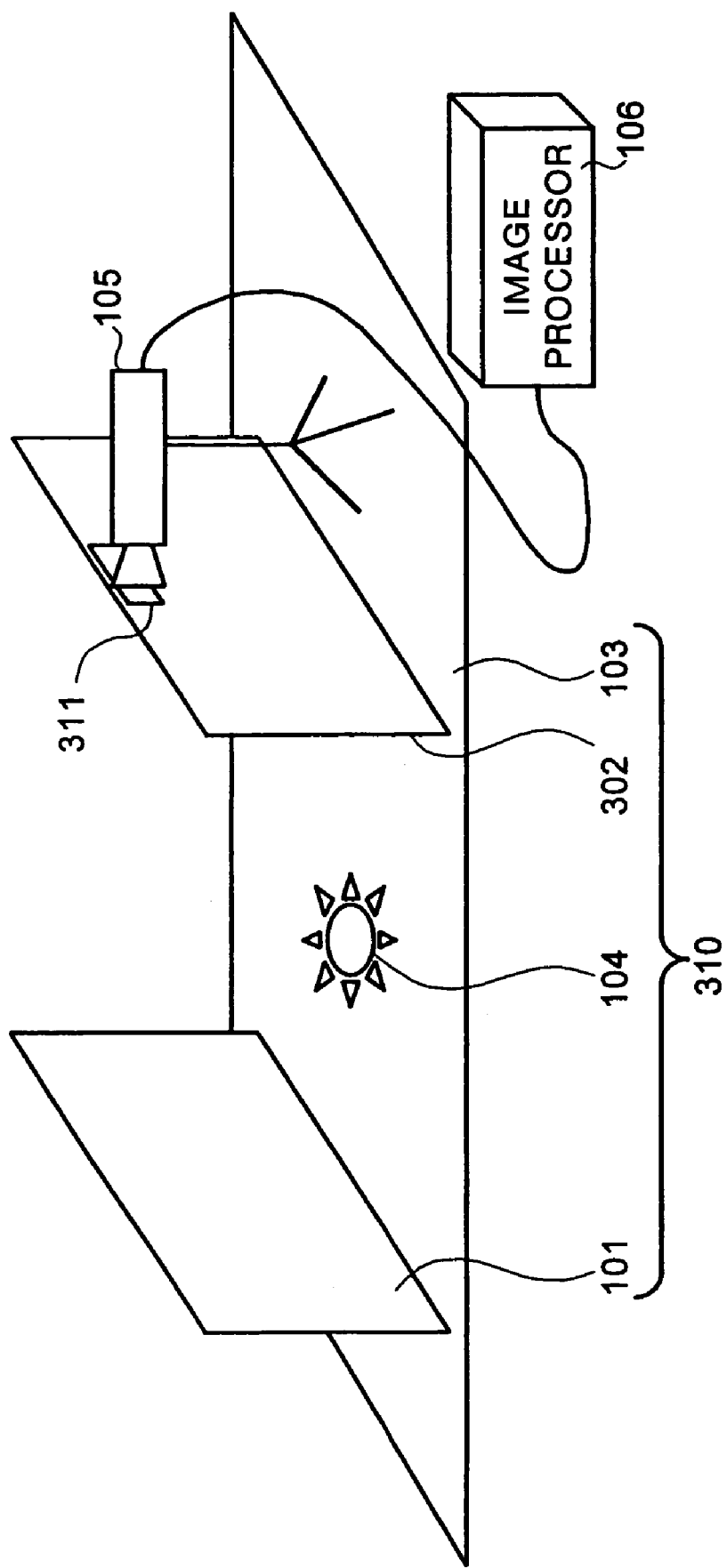
FIG. 10 is a schematic view of a calibration support device according to a third embodiment of the present invention.

FIG. 10 is a schematic view of a calibration support device 310 according to a third embodiment of the present invention. The calibration support device 310 is different from the calibration support device 110 of the first embodiment in that a hole 311 through which the camera takes a picture is provided in a mirror 302. The hole 311 has an aperture whose size is approximately the same as the lens aperture of the camera 105. Moreover, the hole 311 has a shape that does not hinder the view of the camera 105.

Figure 11:
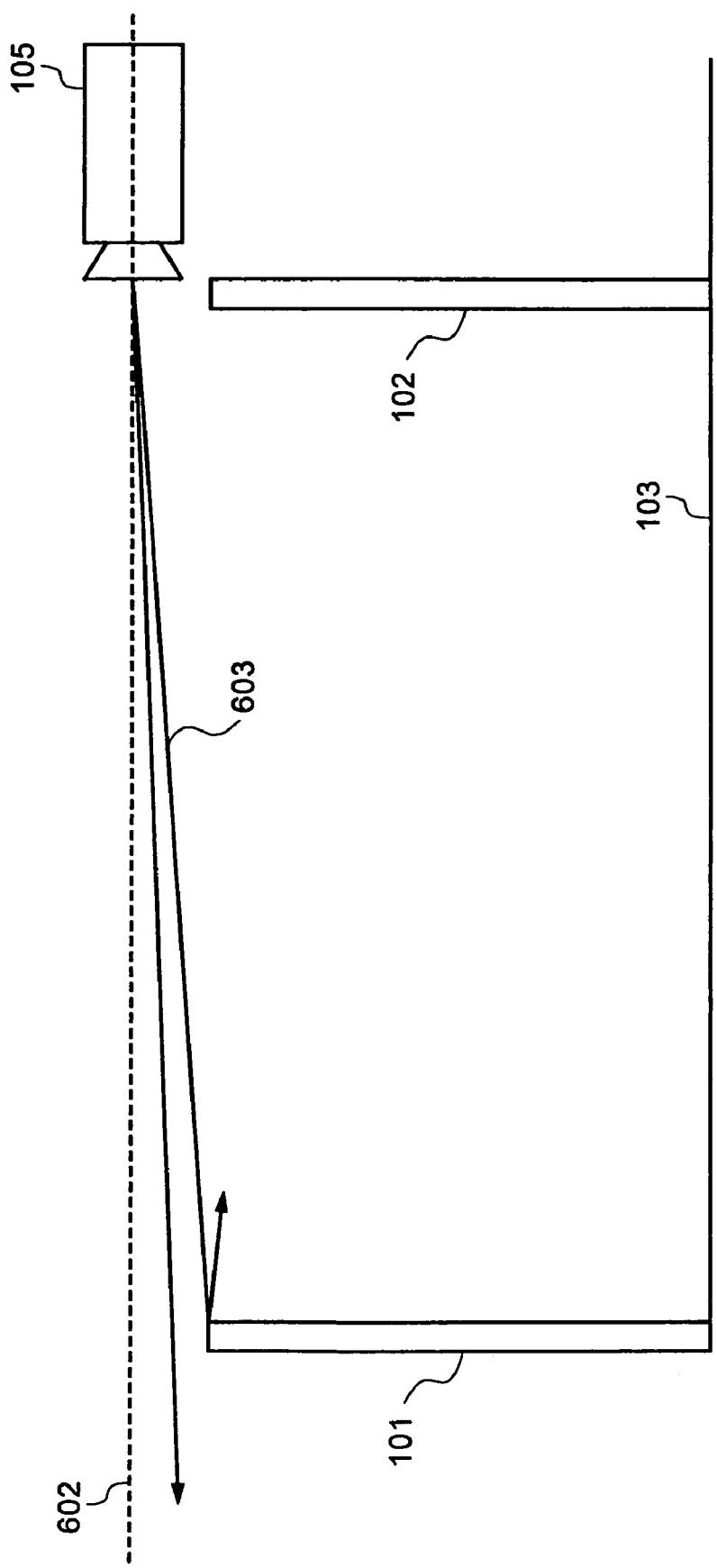
FIG. 11 is an illustration indicating a relation between an optical axis of the camera and an upper bound line to obtain the reflective image in the first embodiment.

FIG. 11 is an illustration indicating a relation between an optical axis 602 of the camera 105 and an upper bound line 603 to obtain the reflective image in the first embodiment. To take a picture of the reflective images which simulate the marks positioned remotely, the camera 105 needs to capture the images near the optical axis 602, as shown in FIG. 11.

In the first embodiment, however, since the camera 105 takes a picture of the mark 104 and its reflective images over the mirror 102, the mirror 101 is not in the optical axis 602 of the camera 105. Therefore, scenery in the back of the mirror 101 is included in the captured image, and thus it is impossible to obtain the reflected images that simulate only the marks.

On the contrary, in the third embodiment, since the mirror 302 has the hole 311 and the camera 105 is installed so that the optical axis 602 passes through the hole 311, it is possible to obtain the reflected images that simulate only the marks. A transparent material (e.g., glass, plastic, or acrylic fiber) or translucent materials (e.g., half mirror) may be filled in the hole 311. Alternatively, a notch is formed in the mirror 302, instead of the hole 311. In other words, the mirror 302 may be provided with not the hole 311 but an optical transmission member that allows light to pass from the back (the mirror 101 and the opposite side) of the mirror 302 to the mirror 101.

Though only one camera is shown in FIG. 10, when the calibration support device 310 is used for the calibration of the stereo camera system that provides with at least two cameras like in the second embodiment, the mirror 302 may be provided with optical transmission members for respective cameras. In this case, the mirror 302 may be provided with a single optical transmission member, and may alternatively be provided with a plurality of optical transmission members corresponding to the position of each camera.

According to a calibration method of the third embodiment, it is possible to capture the reflected images that simulate only the marks. Therefore, it is possible to obtain the captured image containing a lot of marks widely scattered without preparing a vast space, and thus to calibrate the camera system with high accuracy.

In the third embodiment, the mirror 101 may be provided with the optical transmission member. The camera 105 is fixed behind the mirror 101, and takes a picture of the reflective surface of the mirror 302 when the mirror 101 is provided with the optical transmission member.

Figure 12:
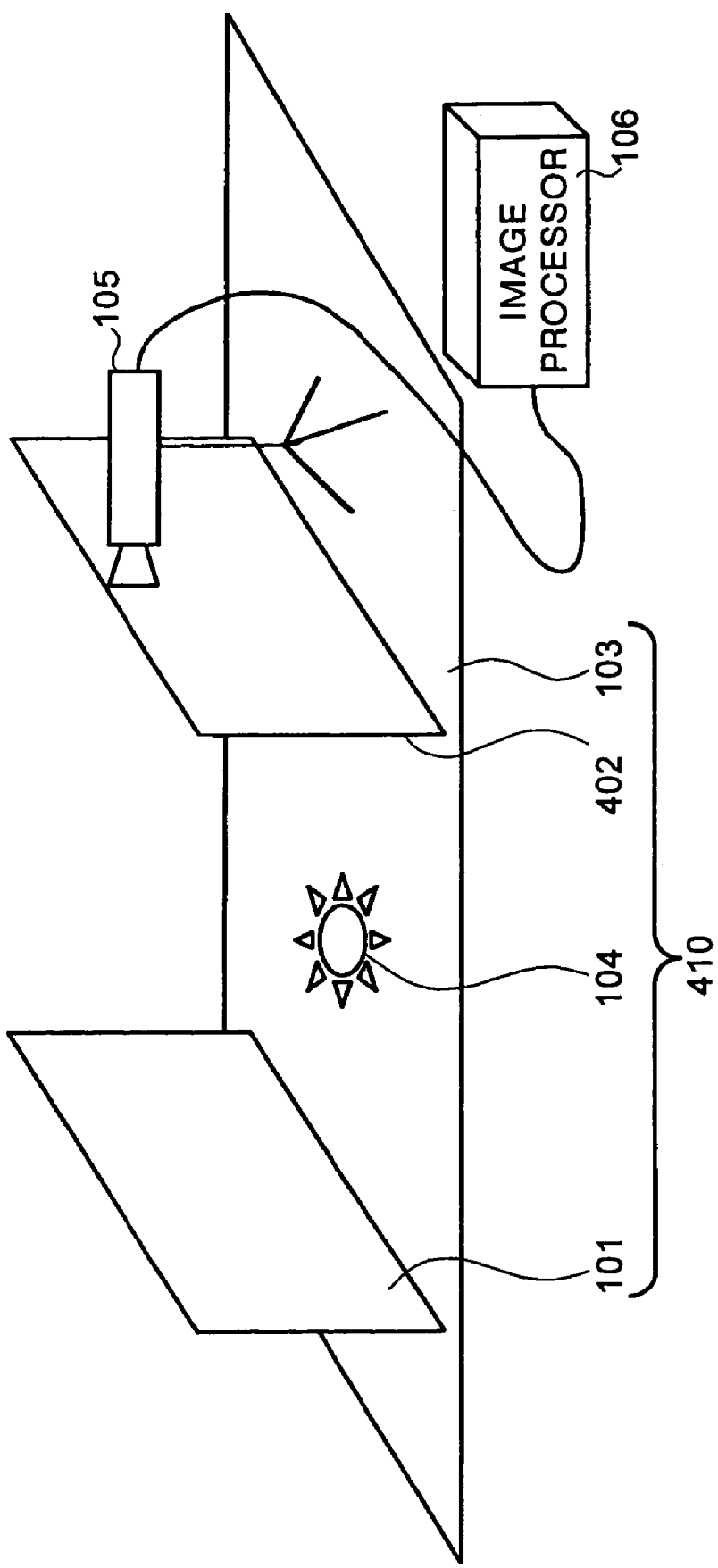
FIG. 12 is a schematic view of a calibration support device according to a fourth embodiment of the present invention.

FIG. 12 is a schematic view of a calibration support device according to a fourth embodiment. The calibration support device 410 of the fourth embodiment is different from that of the first embodiment in that a half mirror 402 is used in place of the mirror 102. In the first embodiment, the camera 105 is fixed above the mirror 102. On the other hand, in the third embodiment, the camera 105 is fixed in a place corresponding to the position where the hole 311 is installed.

In the fourth embodiment, the camera 105 is fixed so that the optical axis of the camera 105 passes through the half mirror 402. As a result, the camera 105 can capture the reflected image in a direction almost parallel to the optical axis of the camera 105.

Figure 13:
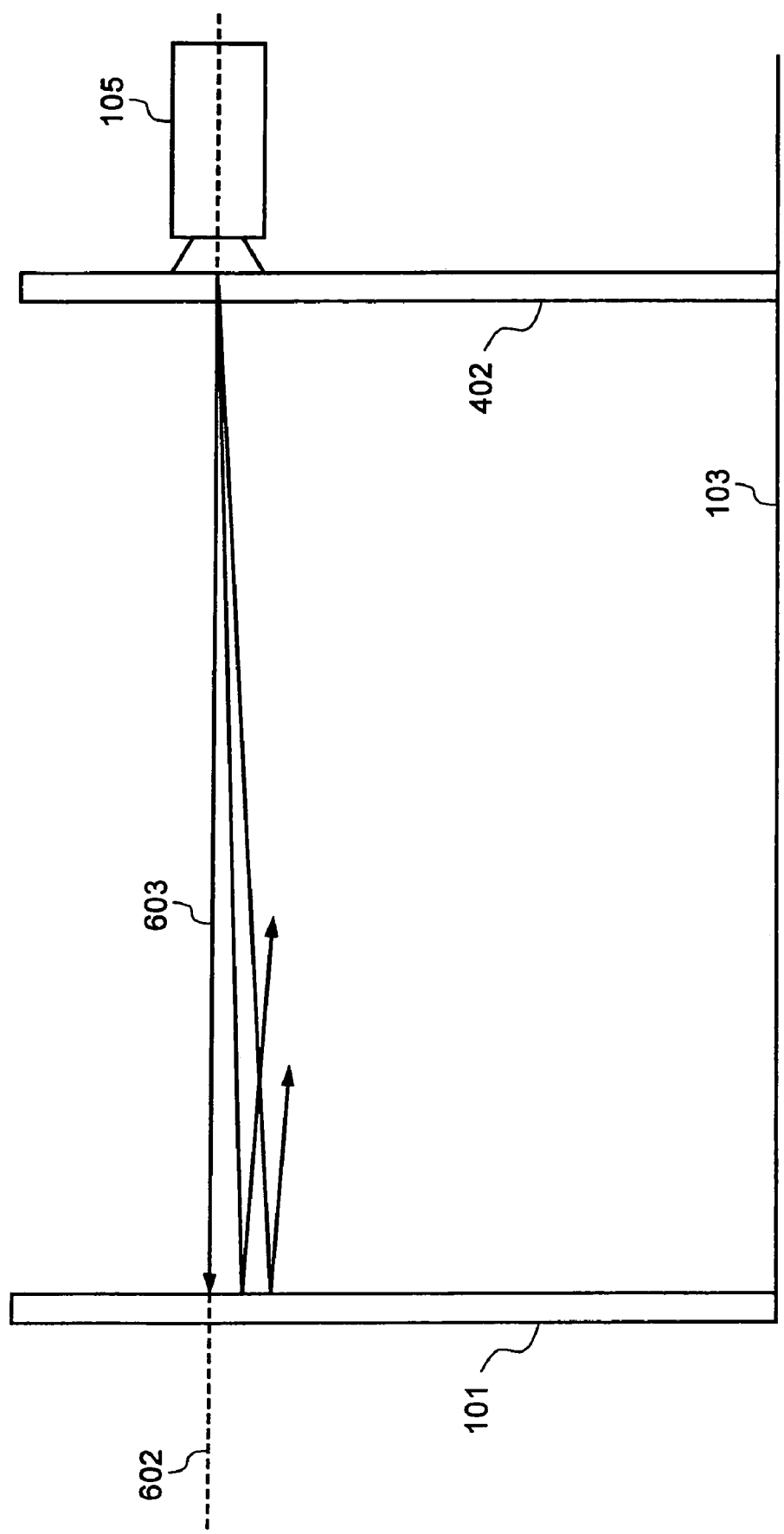
FIG. 13 is an illustration indicating a relation between the optical axis of the camera and the upper bound line to obtain the reflected images when the calibration support device is used for the calibration.

FIG. 13 is an illustration indicating a relation between the optical axis 602 of the camera 105 and an upper bound line 603. Although the optical axis 602 and the upper bound line 603 overlap in the figure, it is possible to obtain the reflected images in a direction very near the optical axis 602. Although a single camera is shown in FIG. 12, the calibration support device 410 may be used for the calibration of the system that includes a plurality of cameras.

According to the fourth embodiment, it is possible to take a picture of the image containing the reflected images that simulate the marks remotely, by the camera installed behind the half mirror 402.

The present invention is not limited to the embodiments as described above, and may be provided as various modifications explained below. The camera system may be manufactured using any of the calibration methods described above. For the manufacturing process including the process of the calibration method, manufacturing the camera system (a system used for the obstacle detection device, a vehicle driving support device, or a vehicle autopilot) installed in the vehicle will be explained below.

Figure 14:
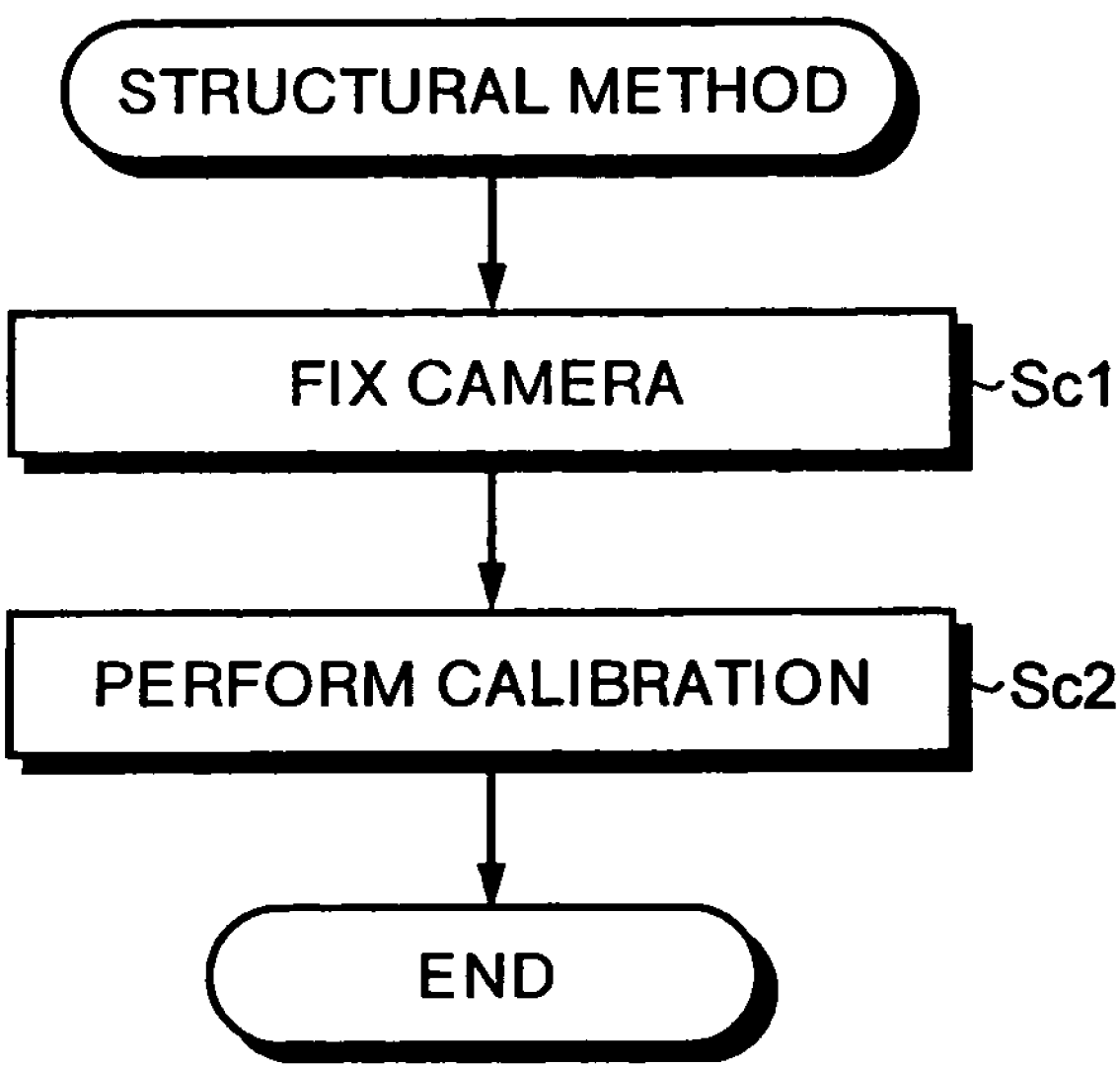
FIG. 14 is a flow chart of a method of manufacturing the camera system.

As shown in FIG. 14, the camera of the camera system acquired by manufacturing or bought by a user is installed in a predetermined position (step Sc1). The predetermined position is, for example, the upper part of a dashboard near the windshield, or the back of the rearview mirror (the reflective surface and the other side), of the vehicle. It is assumed that the camera system is composed of the camera and the main body. The main body includes a setting memory where data (e.g., correction parameters, the projective transformation parameters, and the table data) obtained by the calibration is set.

After the camera is installed in the predetermined position, the calibration according to one of the embodiments as described above is performed (step Sc2). For example, when the calibration method according to the second embodiment is performed, the camera installation position is fine-tuned and the correction parameters are calculated. Moreover, the projective transformation parameters are calculated, and the result is stored in the setting memory.

As a result, it is possible to manufacture the camera system that the parameters for position detection with higher accuracy are set, according to this manufacturing method including the calibration.

According to the first to fourth embodiments, the camera to be calibrated is installed behind the mirror 102. For example, in the first embodiment, the camera 105 is adjusted so as to point to the reflective surface of the mirror 101 and it is fixed above the mirror 102. If it is easy to carry the camera system, the adjustment of the camera and the calibration support device is also easy.

In the camera system (e.g., a system for the obstacle detection device) installed in the vehicle, however, it is difficult that the calibration support device is set up in front of the camera. For example, when the calibration is performed in a production line for the vehicle, since the vehicle is conveyed in the same direction as the front of the vehicle, the calibration support device set up in front of the camera interrupts the manufacturing operation of the vehicle.

To solve this problem, the mirror 901 is placed in front of the camera 105 to refract the optical axis 602 of the camera 105 as shown in FIG. 15. The calibration support device of each of the embodiments is set up in the optical axis 602 refracted by the mirror 901. That is, the mirror 901 is placed in front of the camera 105 so that the image which reflects in the mirror 901 from the position of the camera 105 coincides with a forward view out of the camera.

As a result, the camera 105 can take a picture of an image containing a lot of marks. Therefore, when the calibration is to be performed, the mirror 901 is moved forward of the camera.

If the calibration support device is set up sideward of the production line in the factory, the captured image containing a lot of marks can be obtained. Namely, the manufacturing operation of the vehicle is not interrupted. Even when the calibration of the stereo camera system with a plurality of cameras is performed, the mirror 901 is placed in front of the camera, so that it is possible to take a picture of the image containing a lot of marks in the reflective surface of the mirror 101 that reflects in the mirror 901.

The vehicle carried on the production line is generally elevated than when the vehicle is on the road. Therefore, when a reference plane of the calibration of the camera system installed in the vehicle is a floor of the factory, the calibration is performed with respect to a position lower than the road where the vehicle runs. However, since the camera system such as the obstacle detection devices installed in the vehicle detects a distance based on a mark such as an object (a white line) on the road, it is desirable that a mark for the calibration is placed at the same level as the road.

It is preferable to match a plane level at which the mark for the calibration is placed to a reference plane used when the camera system actually detects a distance, that is, a level of a reference plane used for the processing performed by the camera system. Therefore, when the calibration is performed in the manufacturing process of the vehicle, the calibration support device may be constituted as shown in FIG. 15.

FIG. 15 is an example of the calibration support device when the calibration of the camera system is performed in the manufacturing of the vehicle. This calibration support device includes a base 103-2, the mirrors 101 and 102, and a mark (not shown in the figure) on the base 103-2.

The calibration support device also includes level adjustors 505 to adjust height of the base 103-2 from a floor 910. A vehicle 902 is at a position higher than the floor 910 since the vehicle 902 is carried on the production line. The plane on which the vehicle 902 is placed is a virtual ground plane 103-1. For the vehicle 902, the virtual ground plane 103-1 is a plane at the same level as the road.

A camera system 1501 installed in the vehicle 902 uses a road surface as a reference plane for actual processing of, for example, obstacle detection. That is, the level of the reference plane is the same as the virtual ground plane 103-1. Therefore, it is preferable that the mark for the calibration is placed at the same level as the virtual ground plane 103-1.

The level adjustor 505 adjusts so that the base 103-2 of the calibration support device is at the same level as the virtual ground plane 103-1. As a result, the mark for the calibration is placed at the same level as the virtual ground plane 103-1. Since the level at which the mark is placed only has to coincide with the level of the road, the mark may be placed at the same level as the virtual ground plane 103-1. For example, the top of a pole that has the same height as a height between the floor 902 and the virtual ground plane 103-1 is marked up.

The calibration support device may include a mirror 1002 to refract the optical axis of the camera 105 installed in a vehicle 1004 upward, as shown in FIG. 16. As a result, the camera 105 can take a picture of the image containing a lot of marks that reflect in the mirror 101 installed above the vehicle. In other words, only since the mirror 1002 is moved forward of the camera, the captured image containing a lot of marks is obtained even in the factory where the calibration support device is set up.

Calibration based on the road can be performed for this example by placing the mark 104 in a virtual plane (middle point line in FIG. 16) including a virtual ground plane 1003-1 of camera 105. This virtual plane is a plane where the virtual ground plane 1003-1 is refracted by the mirror 1002 and extends to the mirror 101. Therefore, this virtual plane includes the virtual ground plane 1003-1 and a mark arrangement plane 1003-2 where the mark 104 is placed. That is, a virtual plane is the result of combining the virtual ground plane 1003-1 and the mark arrangement plane 1003-2, and has a shape that these planes intersect at a position of the mirror 1002.

In FIGS. 15 and 16, although the optical axis of the camera is refracted only once by a single mirror (the mirror 902 or the mirror 1002), the optical axis may be refracted a plurality of times by a plurality of mirrors. For example, when the projective transformation parameters are calculated, it is necessary to check the relations between two images captured by the stereo camera. When the relations are checked, it is desirable that the right and left positions of the marks of the images are recorded. Therefore, it is preferable that another mirror is prepared and the optical axis is refracted two times.

As shown in FIG. 17, the calibration support device includes a mirror 1101 placed forward of the cameras 105-1 and 105-2 fixed in a vehicle 1104 and a mirror 1102 placed symmetrically with respect to the mirror 1101. As a result, optical axes 601-1 and 601-2 of respective cameras are substantially refracted.

Moreover, although the mark 104 (a mark 104-1 and a mark 104-2) has a point-shape (almost circular in the figure) in each of the embodiments, the mark may be a line that is normal to the reflective surfaces of the mirrors 101 and 102. If the mark is a line, a straight reflected image in addition to the line mark is projected in the mirror 101 (or the mirror 102). Therefore, a situation as if a white line extends from near the camera to far on the road is produced. As a result, when in the calibration it is assumed that a white line is only at one side of the road lane, even if the system uses two cameras as described in the second embodiment the calibration support device only has to include only one of the marks 104-1 and 104-2.

In each of the embodiments, the calibration apparatus includes the image processor (106, 206). This image processor performs the setting processing for calculating the projective transformation parameters and the like. When the camera system to be calibrated has functions for the calibration, the camera system may perform the calibration processing such as setting for calculating parameters and the like based on the image captured by the camera.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A method for calibration of a stereo camera system that uses a plurality of cameras, comprising;
   disposing a first mirror and a second mirror in such a manner that reflective surfaces of the first mirror and the second mirror face toward each other;
   placing at least two marks on a reference plane between the reflective surface of the first mirror and the reflective surface of the second mirror so that a plurality of reflected figures of the each mark are generated by the first mirror and the second mirror, the reference plane used in processes performed by the stereo camera system;
   capturing with the cameras an image including the plurality of the reflected figures of the each mark;
   determining position of the reflected figures in each of the images, wherein the position of each of the reflected figures is represented by a pair of coordinates; and
   calculating projective transformation parameters for planar projection stereopsis method by using the position of the reflected figures.

2. The method according to claim 1, wherein the first mirror is a half mirror.

3. The method according to claim 1, further comprising:
   positioning the marks at the same height as that of the reference plane.

4. The method according to claim 1, wherein the first mirror has a portion that passes light.

5. The method according to claim 1, wherein the marks includes two marks that are disposed on a line parallel to the reflective surfaces of the first mirror and the second mirror.

6. The method according to claim 1, wherein each of the marks is a line that is normal to the reflective surfaces of the first mirror and the second mirror.

7. The method according to claim 1, further comprising: disposing a third mirror in such a manner that the marks reflected in the first mirror and the second mirror are also reflected in the third mirror, wherein images reflected in the third mirror are captured with the camera.

8. An apparatus for calibration of a stereo camera system that uses a plurality of cameras, comprising:
a first mirror having a reflective surface;
a second mirror having a reflective surface, wherein the reflective surfaces of the first mirror and the second mirror face toward each other;
a plurality of marks that are disposed on a reference plane between the reflective surface of the first mirror and the reflective surface of the second mirror so that a plurality of reflected figures of the each mark are generated by the first mirror and the second mirror, the reference plane used in processes performed by the stereo camera system; and
an image processor that calculates projective transformation parameters for planar projection stereopsis method by using position of reflected figures of the marks in images captured by the cameras, wherein the position of each of the marks is represented by a pair of coordinates.

9. The apparatus according to claim 8, wherein the first mirror is a half mirror.

10. The apparatus according to claim 8, further comprising:
a level adjustor that positions the marks at the same height as that of the reference plane.

11. The apparatus according to claim 8, wherein the first mirror has a portion that passes light.

12. The apparatus according to claim 8, wherein the marks includes two marks that are disposed on a line parallel to the reflective surfaces of the first mirror and the second mirror.

13. The apparatus according to claim 8, wherein each of the marks is a line that is normal to the reflective surfaces of the first mirror and the second mirror.

14. The apparatus according to claim 8, further comprising:
a third mirror disposed in such a manner that the marks reflected in the first mirror and the second mirror are also reflected in the third mirror;
wherein images reflected in the third mirror are captured, with the camera.

15. A method of manufacturing a stereo camera system that uses a plurality of cameras and a memory, comprising:
installing the cameras in a predetermined position;
disposing a first mirror and a second mirror in such a manner that reflective surfaces of the first mirror and the second mirror face toward each other;
placing at least two marks on a reference plane between the reflective surface of the first mirror and the reflective surface of the second mirror so that a plurality of reflected figures of the each mark are generated by the first mirror and the second mirror, the reference plane used in processes performed by the stereo camera system;
capturing with the cameras an image including the plurality of the reflected figures of the each mark;
determining position of the reflected figures in each of the images, wherein the position of each of the reflected figures is represented by a pair of coordinates;
calculating projective transformation parameters for planar projection stereopsis method by using the position of reflected figures; and
storing the projective transformation parameters in the memory.

16. The method according to claim 15, wherein the first mirror is a half mirror.

17. The method according to claim 15, further comprising:
positioning the marks at the same height as that of the reference plane.

18. The method according to claim 15, wherein the first mirror has a portion that passes light.

19. The method according to claim 15, wherein the marks includes two marks that are disposed on a line parallel to the reflective surfaces of the first mirror and the second mirror.

20. The method according to claim 15, wherein each of the marks is a line that is normal to the reflective surfaces of the first mirror and the second mirror.

21. The method according to claim 15, further comprising;
disposing a third mirror in such a manner that the marks reflected in the first mirror and the second mirror are also reflected in the third mirror, wherein images reflected in the third mirror are captured with the camera.

* * * * *